April 1, 1930.  H. FORD  1,752,980

AUXILIARY TRANSMISSION

Filed April 24, 1929   3 Sheets-Sheet 1

INVENTOR.
Henry Ford.
BY C. R. Halbert.
E. L. Davis.
ATTORNEYS.

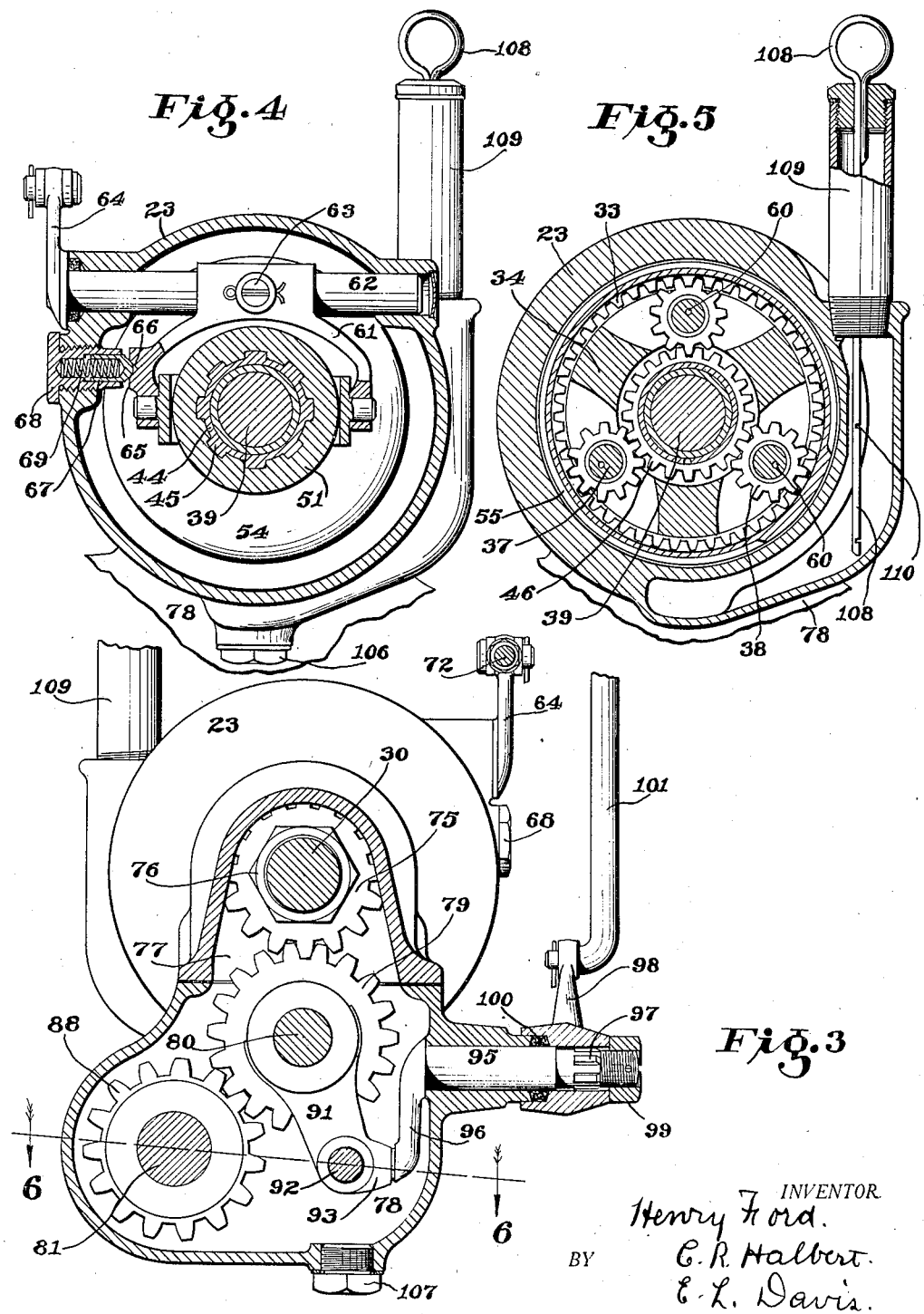

Patented Apr. 1, 1930

1,752,980

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

AUXILIARY TRANSMISSION

Application filed April 24, 1929. Serial No. 357,647.

The object of my invention is to provide improvements in an auxiliary transmission of simple, durable and inexpensive construction.

A further object of my invention is to provide an auxiliary transmission which may be mounted in a motor car frame so as to be readily removed, and replaced with a spacer drive shaft and torque tube.

The motor car chassis in which this device is used is provided with an intermediate transverse frame member which supports the forward end of a conventional torque tube. An engine and sliding gear transmission are mounted in the conventional manner in the chassis frame with a space between the rear end of the sliding gear transmission and the forward end of the torque tube. The applicant's transmission is mounted between this sliding gear transmission and the forward end of the torque tube. If the chassis is desired to be used without the applicant's auxiliary transmission a relatively cheap and simple spacer shaft may be used between these two parts to connect the standard transmission with the torque tube.

In the present day high speed delivery trucks the use of an auxiliary transmission in conjunction with a standard three speed forward and one reverse speed sliding gear transmission has proven highly satisfactory. The purpose of this installation is to provide four additional speeds, each of which is slightly reduced from the corresponding speed obtained in the main transmission.

When a delivery truck is operating in traffic and with a comparatively heavy load therein a reduction is needed on all of the main transmission speeds to get maximum performance out of the truck. When this same delivery truck is returning empty it is desirable to have the normal transmission speeds in order that maximum acceleration may be had.

There are certain lines of business with which an auxiliary transmission equipped truck has proven highly satisfactory, however, there are others in which the transmission is very seldom if ever used. It is very difficult to tell before the truck is purchased whether or not an auxiliary transmission will be worth its cost, and consequently, many trucks are sold without the auxiliary transmission which the owners discover later would be a very profitable addition thereto.

The cost of installing in an existing motor truck any of the auxiliary transmissions of which the applicant has knowledge is extremely high. The position of the main transmission and rear axle, of course, must remain constant and, as the auxiliary transmission must be placed in between these two units, it requires the scrapping of the existing torque tube and drive shaft and the substitution of a relatively expensive special torque tube and drive shaft to be used with the auxiliary transmission. There are certain types of auxiliary transmissions which are placed in the rear axle housing but the installation of these transmissions are equally as bad because they require the scrapping of practically the whole rear axle unit.

It has been the object of the applicant to secure an auxiliary transmission which may be placed between the existing torque tube and transmission unit without the altering of either and which may involve a very small labor charge and the scrapping of only an insignificant part. The applicant secures this desirable result by making his transmission so that it may be used interchangeably with a drive shaft spacer.

The normal procedure in the marketing of such a device is to sell the truck equipped with a solid drive shaft in place of the auxiliary transmission and, when the purchaser discovers that an auxiliary transmission would be a valuable addition, the auxiliary transmission is then inserted in the space occupied by the solid drive shaft with comparatively little labor and the scrapping of only a relatively cheap part. The loss through the scrapping of the existing torque tube and drive shaft by the ordinary auxiliary transmission installation amounts to about the cost of the auxiliary transmission itself and so the value of the applicant's arrangement is considerable.

Still a further object of my invention is to provide an auxiliary transmission having a main housing member with only one cover plate on one end to thereby make the transmission a more sturdy and compact unit. The Patent No. 1,674,006, issued to the applicant, shows the type of gearing and control which the applicant uses in his present transmission. It will be noted that the earlier transmission has two housing members with a stationary plate between them, this plate having internal teeth cut therein. There are two flanged joints in the housing of this transmission near its center which tend to weaken this structure. In the applicant's present invention this stationary plate 35 is eliminated and only one joint is required which is near one end of the transmission and does not tend to weaken the body portion to the degree shown in the older transmission structure.

A further object of my invention is to provide an improved method for lubricating the planet gear bearings. Up to the present, the lubrication of the planet gear bearings has been a source of annoyance because the lubricant would be thrown outwardly away from the bearings by the centrifugal force of the lubricant. In the device herein shown, the centrifugal action of the lubricant is used to conduct the lubricant to the actual bearing surface of the planet gears and thereby provide ample lubrication for them.

Still a further object of my invention is to provide a power take-off unit in connection with the auxiliary transmission and to so mount this power take-off unit that it may be fastened to the transmission at any time with practically no labor charge or scrapping of parts.

With these and other objects in view, my invention consists in the arrangement, combination and construction of the various parts of my improved device as described in the specification, claimed in the claims and shown in the accompanying drawings, in which:

Figure 3 shows a sectional view taken on the line 3—3 of Figure 2.

Figure 4 shows a sectional view taken on the line 4—4 of Figure 2.

Figure 5 shows a sectional view taken on the line 5—5 of Figure 2.

Figure 6:
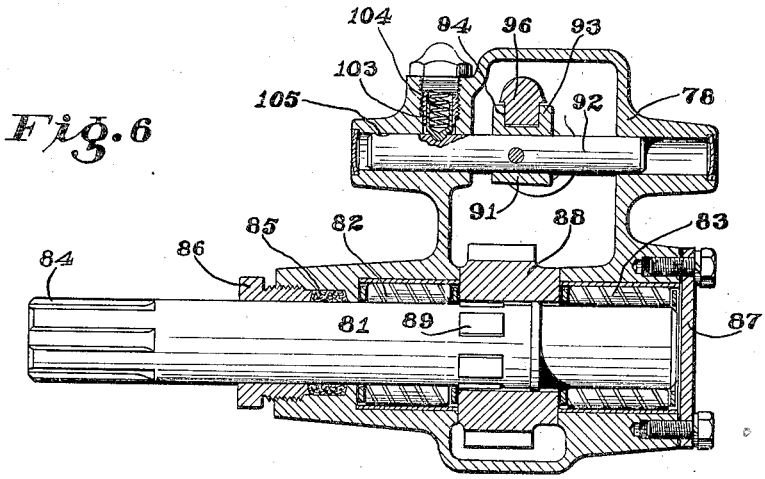
Figure 6 shows a sectional view taken on the line 6—6 of Figure 3.
Figure 1:
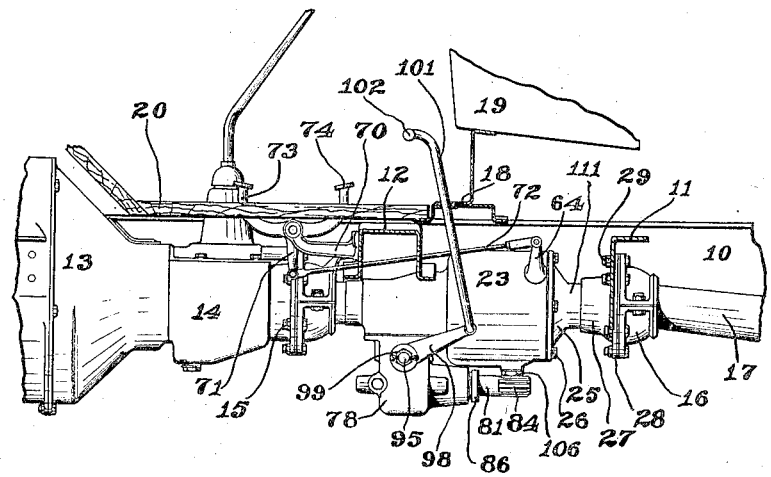
Figure 1 shows a plan view of the rear end of an internal combustion engine having a main transmission assembly, a torque tube, my improved auxiliary transmission and power take-off unit mounted in between the main transmission and the torque tube, and the control mechanism for these various parts.

Referring to the accompanying drawings, I have used the reference numeral 10 to indicate generally the frame of an automobile having a central cross member 11 and also a second cross member 12 disposed somewhat forwardly of this cross member 11. An engine and clutch unit 13 is secured in the forward part of the frame 10 and a conventional sliding gear transmission 14 is secured to the rear end of this clutch unit. A universal joint housing 15 is mounted at the rear end of the transmission 14 and my improved auxiliary transmission is secured at its forward end to this universal joint housing and at its rear end to the cross member 11.

A second universal joint housing 16 is mounted on the rear side of the cross member 11 and supports a torque tube 17. A body sill member 18 supports a driver's seat 19 and the floor boards 20.

Figure 2:
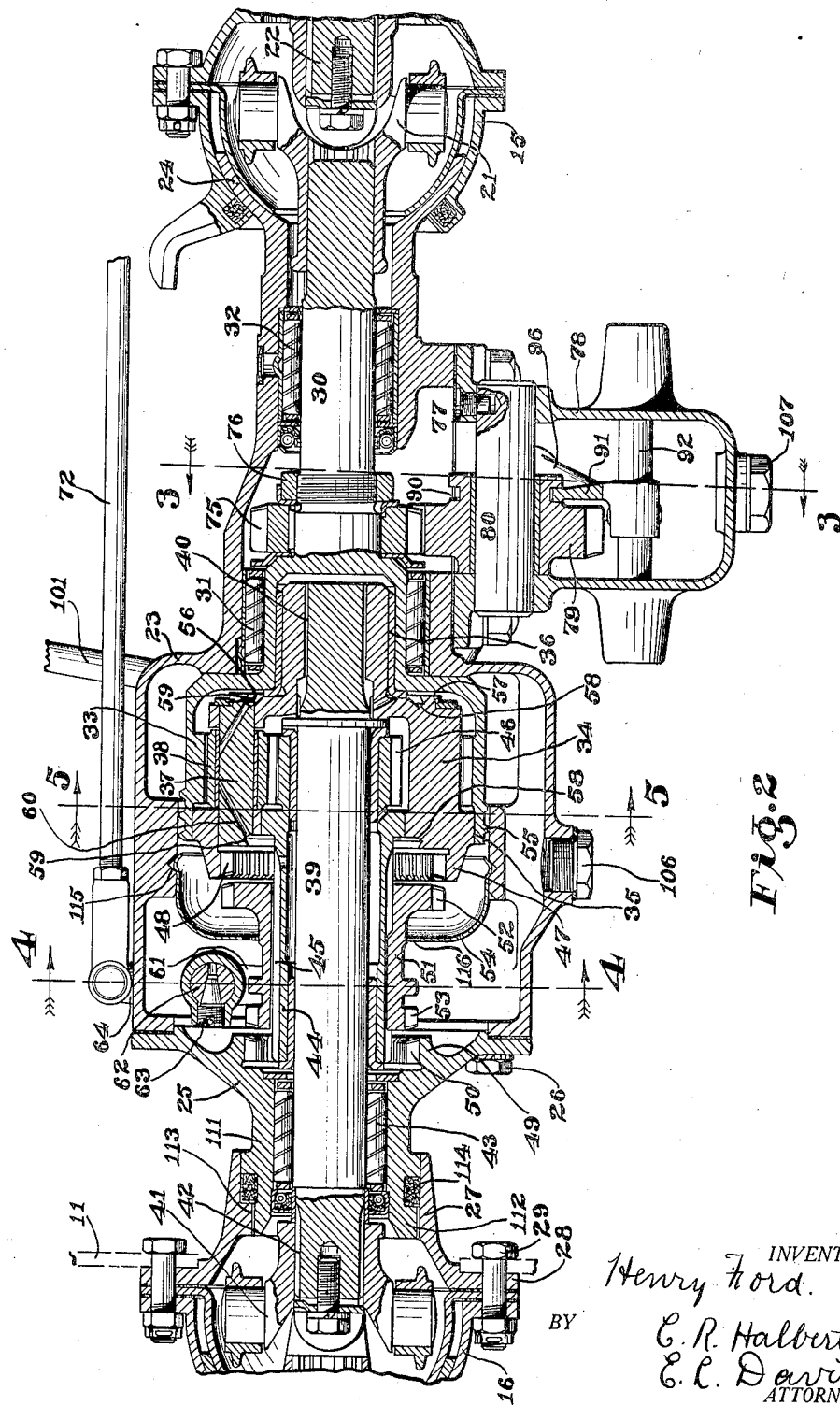
Figure 2 shows a vertical central longitudinal sectional view through the auxiliary transmission illustrated in Figure 1.

Referring to Figure 2, a universal joint 21 is disposed inside of the universal joint housing 15 and is connected to a drive shaft 22 extending from the rear end of the sliding gear transmission 14. An auxiliary transmission housing 23 is formed with a spherical flange 24 at its forward end to co-act with the universal joint housing 15. The rear portion of the housing 23 is enlarged to receive the transmission gearing proper which will be described later. A head member 25 is secured to the rear end of the enlarged portion of the housing 23 by means of the bolts 26 and forms an enclosure for the transmission gearing. A sleeve 27 having a radial flange 28 extending from its rear end is mounted on the head 25, the flange being clamped between the rear universal joint housing 16 and the cross member 11 by means of the bolts 29. The rear end 111 of the head 25 is splined at 112 to co-act with corresponding splines 113 in the sleeve 27. A packing 114 insures an oil tight connection at this point.

Briefly, this device consists of a pair of universal joint housings, the forward one being secured to the rear end of a sliding gear transmission and the rearward one being secured to the forward end of a torque tube. A sleeve is secured to this rear universal joint housing and is also secured to the frame cross member. A transmission housing is mounted between the forward universal joint housing and this sleeve and suitable splines prevent the housing from rotating relative to the sleeve or cross member.

The transmission gearing is very similar to the gearing shown in the applicant's Patent 1,674,006 and consequently the present gearing will be only briefly described herein, the detailed description showing wherein the parts differ from the construction described in this previous patent.

A shaft 30 is rotatably mounted in the housing 23 by means of the roller bearings 31 and 32 and is secured at its forward end to the universal joint 21. An internal gear 33 is formed on the rear end of the shaft 30, the whole being rotatably mounted within the housing 23.

A planet gear carrier 34 is rotatably mounted within the internal gear 33 by means of the bearings 35 and 36. Three planet pins 37 are mounted in the carrier 34 and a planet gear 38 is rotatably mounted on each of these pins in position to mesh with the internal gear 33.

A driven shaft 39 is secured to the planet carrier 34 at its forward end by means of the splines 40 and is secured to a rear universal joint 41 in the universal joint housing 16 by means of the splines 42. The forward end of this driven shaft is supported by the planet carrier 34 while the rear end is rotatably mounted in a roller bearing 43 in the sleeve 111.

A sleeve 44 is rotatably mounted on the shaft 39 between the bearing 43 and the planet carrier 34. The rear portion of this sleeve 44 is provided with external splines 45 while a sun gear 46 is formed on the forward end in position to mesh with the planet gears 38.

A sleeve 47 projects rearwardly from the rear face of the planet carrier 34 having internal clutch teeth 48 machined therein. A second sleeve 49 extends forwardly from the head 25 and internal teeth 50 are machined in this sleeve.

A clutch 51 having external clutch teeth 52 and 53 in position to mesh with the internal clutch teeth 48 and 50, respectively, is slidably mounted on the splines 45 so that a forward motion of the clutch 51 will lock the sleeve 44 and the planet carrier 34 together, and so that a rearward motion of this clutch 51 will lock the sleeve 44 to the rear head member 25.

The operation of this device has been described fully in the applicant's patent referred to, it being sufficient here to say that when the sun gear 46 is held stationary and the drive taken through the drive shaft 30, a reduced speed is imparted to the planet carrier 34 which drives the drive shaft 39 at this reduced speed. When the sun gear 46 is locked to the planet carrier 34, the planet carrier, sleeve, and internal gear 33 rotate as a unit thereby driving the shaft 39 at the same speed as the drive shaft 30.

In the applicant's patent referred to, there is only one group of clutch teeth which meshes alternately with the planet carrier teeth and the teeth on a stationary plate, while in this improved transmission two sets of clutch teeth are provided which mesh with the planet carrier teeth and the teeth on the head, respectively. The stationary plate just mentioned was interposed between a two-part housing which made a rather expensive construction while the present construction makes a considerably stronger and cheaper unit and in no way interferes with the operation or lubrication of the device.

The method of lubricating the device is as follows:

A cup shaped member 54 is secured in the interior bore of the housing 23 by means of a groove 115 into which the rim of the cup is expanded. An opening 116 is provided in the bottom of the cup 54 so that the clutch teeth 53 may extend therethrough. The clutch teeth 52 are placed forwardly of this opening so that when the clutch 51 is moved to its extreme rearward position the opening 116 will be closed so that oil will not be permitted to flow through this opening 116. The cup member 54 performs all the lubrication functions that are performed by the plate 35 in the applicant's older transmission.

A spiral rib 55 is formed on the outer surface of the internal gear 33 so that when this gear rotates the spiral rib tends to force oil from outside of the gear 33 into the chamber formed between the planet carrier 34 and the cup member 54. This oil is then forced through suitable openings to the bearings for the sleeve 44 and to the gear teeth in general.

The means provided for lubricating the planet gear bearings consists of the following:

The planet pins 37 are secured in the planet carrier by means of a ring 56 which is sprung into a suitable groove 57 in the forward face of the planet carrier 34 and the forward end of the pins 37. The pins are thus non-rotatably secured in the planet carrier. An annular internal groove 58 is machined in both the forward and the rear walls of the planet carrier 34 adjacent to the inner side of the pins 37. Each end of these pins 37 is notched at 59 so that the notches 59 and grooves 58 form a pair of continuous annular internal grooves, one on each side of the carrier. A pair of oil holes 60 are drilled in the pins 37 and connect the notches 59 with the outer side of the pins near their middle portions.

When the planet carrier is rotated the recesses 58 and the notches 59 are filled with oil by centrifugal action. The holes 60, being drilled from the notches 59, conduct this oil to the planet gear bearings by centrifugal action and effectively lubricates them.

The method of lubricating these bearings although extremely simple and requiring no extra parts is one of the features which makes the applicant's invention very efficient and extremely long lived.

The clutch shifting mechanism consists of the conventional clutch fork 61 which is secured to a transverse shaft 62 by means of a screw 63. The shaft 62 is rotatably mounted in the upper part of the housing 23 and extends through this housing on one side where an arm 64 is formed thereon. One of the arms of fork 61 is flattened at 65 and has three depressions 66 sunk in this flattened portion. A plunger 67 is reciprocally mounted in a bearing 68 which is screwed into the housing 23 and is urged into contact with the flattened portion 65 by means of a spring 69. These various parts are so proportioned that the plunger 66 will be extended into one of these depressions in each of the positions of the clutch 51, that is, when the clutch is engaged with the planet carrier, when it is in the neutral position, and when it is engaged with the head 25. The shifting mechanism is thus resiliently held in any one of the three positions without further locking.

A bracket 70 extends forwardly from the cross member 12 and a clutch shifting mechanism is pivotally mounted thereon. This shifting mechanism consists of a forked pedal pivotally mounted on the arm 70 at the crotch of the fork and having the downwardly extending arm 71 connected to the upwardly extending arm 64 by a suitable rod 72. The upwardly extending arms 73 of this forked pedal each have a head 74 formed thereon.

When the head on the forward arm 73 is depressed the arm 71 is moved rearwardly which moves the arm 64 by means of the rod 72 in the rearward direction. This moves the clutch 51 forward and puts the gearing in a direct drive so that the transmission acts as a solid drive between the torque tube and the first transmission 14.

If both the heads 74 are positioned equally the clutch 51 is moved to the neutral position and further depression of the rear head 74 moves the clutch so that the reduced speed drive is engaged. This operation is normally performed with the driver's foot and in no way interferes with the selective gear shift mechanism of the ordinary transmission.

The driving shaft 30 is provided with a spur gear 75 which is keyed thereto and held in place between the bearings 31 and 32 by a nut 76. An opening 77 is provided in the under side of the housing 23 adjacent to this gear 75 to which a power take-off unit may be bolted.

The power take-off unit consists of a housing 78 having an idler gear 79 rotatably mounted on a stationary shaft 80 in the upper part of this housing in position to mesh with the gear 75. The gear 79 is so proportioned that it may be slid axially out of engagement with the gear 75.

A driven shaft 81 is rotatably mounted in the lower part of the housing 78 by means of bearings 82 and 83. The shaft 81 extends rearwardly through the housing and is provided with suitable splines 84 whereby it may be used to drive any one of the numerous accessories. A packing 85 and gland 86 prevent lubricant from leaking out of the housing 78 at the point where the shaft 84 emerges. The opening in the forward side of this housing 78 which houses the bearing 83 is closed by a plate 87 to prevent lubricant from leaking out at this point.

A driven gear 88 is secured onto the shaft 81 by means of the splines 89 and is secured against axial movement by the housing 78. The gear 89 is of sufficient width to be in constant mesh with at least part of the gear 79 so that when the latter is slid into engagement with the gear 75 this gear will drive the gear 89 through the idler gear 79.

The gear 75 is provided with a groove 90, and a shifter fork 91 is mounted in this groove so that an axial movement of the shifter fork will shift the gear 75 with it.

A third shaft 92 is mounted in the housing 78 and is free to move axially. The fork 91 is secured to the central portion of the shaft 92. The hub portion of the fork 91 has an outwardly extending boss 93 into which a vertical groove 94 is machined.

A shifting shaft 95 is rotatably mounted in one of the side walls of the housing 78 and a downwardly extending crank 96 is formed on the inner end of this shaft in position to co-act with the groove 94 in the fork 91. The outer end of the shaft 95 is splined at 97 and an operating lever 98 is secured on these splines by means of the nut 99. A packing 100 is placed between the lever 98 and the housing 78 to prevent lubricant from leaking out of the housing at this point. An operating rod 101 extends upwardly from the lever 98 into the driving compartment and a suitable handle 102 is provided on the upper end of this rod.

A suitable plunger 103 is mounted in the housing 78 adjacent to the shaft 92 and is urged by a spring 104 into either of a pair of depressions 105 in the shaft 92. The gear 79 is thus resiliently held in the engaged or in the non-engaged positions by means of this spring actuated plunger.

The operation of the device is as follows:

When the transmission is desired to be used without the power take-off running, the operator pushes the handle 102 downwardly which rotates the shaft 95 thereby moving the shaft 92 forwardly and also moving the idler gear 79 forwardly by means of the fork 91 so that the gear 75 on the shaft 30 does not drive the idler gear 79. When the power take-off is desired to be used the handle 102 is simply pulled upwardly which reverses the movement of the various parts and meshes the gear 79 with the gear 75. The idler gear 79 never being out of mesh with the driven gear 81, this gear is consequently driven by the gear 75.

With this arrangement of the power take-off it is possible to drive the power take-off shaft at any of the speeds obtained in the sliding transmission, either while the car is running or while it is stationary. Power take-off devices have ordinarily been provided ahead of the transmission because it is sometimes necessary to operate them when the car is standing still. A disadvantage of this arrangement is that only one speed is obtainable on the power take-off shaft while in the applicant's arrangement three forward speeds and a reverse speed are obtainable and either while the car is operating or while it is standing still.

Another unique feature of the applicant's device is that when the car is sold a relatively simple plate may be mounted over the opening 77 in the housing 23 in place of the power take-off mechanism and, if the owner of the car later finds it desirable to use a power take-off mechanism, it is a relatively simple matter to remove this plate, bolt on a power take-off unit as described without tampering with the mechanism of the auxiliary transmission.

Both the transmission housing 23 and the power take-off housing 78 are provided with drain plugs 106 and 107, respectively. A bayonet type oil indicator rod 108 is mounted in a tube 109 extending vertically from one side of the housing 23. Suitable markings 110 are placed on this bayonet 108 so that the amount of oil in the transmission may be ascertained.

Many advantages are gained by the use of my improved transmission. I am enabled to manufacture a car with a simple solid drive shaft between the universal joints 21 and 41 and when the purchaser decides that it would be desirable to have an auxiliary transmission, it is a comparatively simple matter to remove this short drive shaft and to replace the same with the auxiliary transmission unit. A further advantage results in that the power take-off unit may be marketed in the same manner.

Still a further advantage results in that I am able to lubricate the planet gears of the transmission in a simple and superior manner to prolong the life of the transmission.

Still a further advantage results because I have dispensed with the stationary clutch plate and the improved transmission is cheaper to manufacture and of stronger construction.

Some changes may be made in the arrangement and construction of the various parts of my improved device without departing from the spirit of my invention and it is my intention to cover by the following claims such changes as may be reasonably included within the scope thereof.

I claim as my invention:

1. In a vehicle having a pair of spaced universal joints secured to its frame member, a main transmission disposed forwardly of said pair of universal joints, a torque tube disposed rearwardly of said pair of universal joints and supported thereby, and an auxiliary transmission disposed between said pair of universal joints and supported entirely by said joints.

2. In an auxiliary transmission, a plurality of planet gears, a planet carrier, a plurality of planet pins fixed in said planet carrier and upon which said planet gears are rotatably mounted, an internal groove machined in said planet carrier, a continuation of said groove machined in said pins, and a diagonal opening drilled in said pins to conduct lubricant from said groove to said planet gear bearing surfaces by the centrifugal action of the lubricant.

3. In an auxiliary transmission, an internal gear, a planet carrier having planet pins fixed therein, a pair of grooves in said planet carrier said grooves extending through said planet pins, a diagonal opening extending from each end of each planet pin to the opposite side of said planet pin near its central portion so that centrifugal action will force oil through both of said openings, and means other than centrifugal action for forcing oil through one of said openings.

4. In an auxiliary transmission, a housing having a planetary gearing disposed therein, partitioning means for partially dividing the housing into two chambers, means for forcing lubricant from one chamber into the other, clutch teeth formed on the housing, a clutch member adapted to selectively co-act with said clutch teeth, and a flange formed on said clutch member which will co-act with said partitioning means to form two independent chambers within the housing.

5. In an auxiliary transmission, a housing having a planetary gearing disposed therein, a cup shaped member partially dividing the housing into two chambers, means for forcing lubricant from one chamber into the other, clutch teeth formed on said housing, a clutch member adapted to selectively co-act with said clutch teeth, a flange formed on said clutch member which will co-act with said cup shaped member to form two independent chambers within the housing when the clutch member is in mesh with said clutch teeth.

6. In an auxiliary transmission, a housing having a planetary gearing disposed therein, a universal joint member having splines thereon secured to a vehicle frame member, and a head for said housing having splines co-acting with the splines on said joint member.

7. In an auxiliary transmission, a housing having a planetary gearing disposed therein, a universal joint member having splines thereon secured to a vehicle frame member, a head for said housing having splines coacting with the splines on said joint member, clutch teeth formed on said head member, a clutch member having corresponding teeth formed thereon, and means for shifting said clutch into engagement with the teeth on said head member.

HENRY FORD.